United States Patent
Lin et al.

(10) Patent No.: US 12,484,627 B2
(45) Date of Patent: Dec. 2, 2025

(54) ELECTRONIC CIGARETTE HAVING ENCRYPTION CHIP FOR ANTI-COUNTERFEITING AND ANTI-COUNTERFEITING METHOD THEREOF

(71) Applicant: HUIZHOU HAPPY VAPING TECHNOLOGY LIMITED, Guangdong (CN)

(72) Inventors: Guangrong Lin, Guangdong (CN); Xianbin Zheng, Guangdong (CN); Xiyong Zhang, Guangdong (CN)

(73) Assignee: HUIZHOU HAPPY VAPING TECHNOLOGY LIMITED, Huizhou (CN)

( * ) Notice: Subject to any disclaimer, the term of this patent is extended or adjusted under 35 U.S.C. 154(b) by 628 days.

(21) Appl. No.: 17/628,556

(22) PCT Filed: Aug. 10, 2020

(86) PCT No.: PCT/CN2020/108082
§ 371 (c)(1),
(2) Date: Jan. 19, 2022

(87) PCT Pub. No.: WO2021/036767
PCT Pub. Date: Mar. 4, 2021

(65) Prior Publication Data
US 2022/0361581 A1    Nov. 17, 2022

(30) Foreign Application Priority Data
Aug. 30, 2019    (CN) .......................... 201910816738.8

(51) Int. Cl.
*A24F 40/50*    (2020.01)
*A24F 40/40*    (2020.01)
(Continued)

(52) U.S. Cl.
CPC .............. *A24F 40/50* (2020.01); *A24F 40/40* (2020.01); *G06F 21/44* (2013.01); *H03K 3/037* (2013.01);
(Continued)

(58) Field of Classification Search
None
See application file for complete search history.

(56) References Cited

U.S. PATENT DOCUMENTS

2016/0267266 A1*  9/2016  Yamamoto .............. G06F 21/44
2016/0309788 A1* 10/2016  Hawes .............. A61M 15/0065
(Continued)

FOREIGN PATENT DOCUMENTS

CN    106408314 A  *  2/2017
CN    109480342 A     3/2019
(Continued)

OTHER PUBLICATIONS

CN106408314A, Commodity anti-counterfeiting method based on NFC technology, (Year: 2017).*
(Continued)

*Primary Examiner* — Michael J Felton

(57) ABSTRACT

The disclosure provides an electronic cigarette having an encryption chip for anti-counterfeiting and an anti-counterfeiting method thereof. The electronic cigarette comprises a vaporizer and a battery assembly connected in a detachable manner. The vaporizer comprises an encryption chip preset with an anti-counterfeiting code. The battery assembly comprises a battery and a control circuit board arranged with a microcontroller and a switching circuit. A circuit connection between the encryption chip and the microcontroller is achieved. The microcontroller and the encryption chip are configured in such a manner that, the microcontroller reads the anti-counterfeiting code preset in the encryption chip,
(Continued)

compares it with the anti-counterfeiting code preset in the microcontroller, controls switching on of the switching circuit to allow the electronic cigarette to enter a standby state if the anti-counterfeiting code is correct, and controls switching off of the switching circuit if the standby time exceeds the preset standby time.

7 Claims, 5 Drawing Sheets

(51) Int. Cl.
*G06F 21/44* (2013.01)
*H03K 3/037* (2006.01)
*H04L 9/32* (2006.01)
(52) U.S. Cl.
CPC ........ *H04L 9/3278* (2013.01); *H04L 2209/12* (2013.01)

(56) References Cited

U.S. PATENT DOCUMENTS

2017/0325289 A1* 11/2017 Liu ...................... H05B 1/0227
2018/0060873 A1*  3/2018 Chu ....................... G06K 19/10
2021/0259315 A1*  8/2021 Lin ......................... A24F 40/42

FOREIGN PATENT DOCUMENTS

| CN | 110447974 A | 11/2019 |
| CN | 210747258 U |  6/2020 |
| CN | 210988236 U |  7/2020 |

OTHER PUBLICATIONS

International Search Report of PCT Patent Application No. PCT/CN2020/108082 issued on Oct. 28, 2020.

* cited by examiner

ELECTRONIC CIGARETTE HAVING ENCRYPTION CHIP FOR ANTI-COUNTERFEITING AND ANTI-COUNTERFEITING METHOD THEREOF

TECHNICAL FIELD

The disclosure relates to the field of electronic cigarettes, more particularly to an electronic cigarette having an encryption chip for anti-counterfeiting and an anti-counterfeiting method of the electronic cigarette having an encryption chip for anti-counterfeiting.

BACKGROUND

Usually, an electronic cigarette comprises a vaporizer and a battery assembly. The electronic cigarette heat and vaporize the electronic cigarette liquid by means of the vaporizer, to produce vapor for the smoker. Since the electronic cigarette liquid does not contain the tobacco tar and thus the vapor produced by the electronic cigarette does not contain the tobacco tar, the harm to the human body is reduced at a certain extent. Thus, the electronic cigarettes are widely used and gradually replace tobacco cigarettes.

With the rise in popularity of the electronic cigarette, sales of the electronic cigarettes in the market grow year by year. Some famous electronic cigarettes with good quality are very popular among customers and are in great demand. Meanwhile, some electronic cigarettes which are not selling well due to poor quality may be passed off as the famous electronic cigarettes or vaporizers for replacement. These electronic cigarettes with poor quality may be attractive to consumers due to low price. However, during use, these electronic cigarettes with poor quality may be prone to deficiencies such as liquid leakage, circuit break, insufficient vapor, and poor e-cigarette liquid quality, which may contribute to poor user experience for users and bad reputation for legitimate manufactures. The existing electronic cigarettes have failed to effectively overcome the problem of how to realize anti-counterfeiting for the vaporizers of electronic cigarettes and verify genuine product to prevent counterfeits.

SUMMARY

Technical Problem

An object of the disclosure is to overcome the above deficiencies and provide an electronic cigarette having an encryption chip for anti-counterfeiting and an anti-counterfeiting method thereof. The electronic cigarette having an encryption chip for anti-counterfeiting, which comprises a vaporizer additionally arranged with a chip, can effectively achieve identification of genuine products and realize anti-counterfeiting.

Technical Solutions

The disclosure provides a technical solution as follow. An electronic cigarette having an encryption chip for anti-counterfeiting comprises a vaporizer and a battery assembly which are connected in a detachable manner, wherein the vaporizer is arranged with an encryption chip, and a heating element for heating and vaporizing electronic cigarette liquid. The encryption chip is preset with an anti-counterfeiting code. The battery assembly comprises a battery and a control circuit board, wherein the control circuit board is arranged with a microcontroller and a switching circuit. In the case that the vaporizer is connected with the battery assembly, a circuit connection between the encryption chip and the microcontroller is achieved. The microcontroller and the encryption chip are configured in such a manner that, the microcontroller reads the anti-counterfeiting code preset in the encryption chip, compares it with the anti-counterfeiting code preset in the microcontroller to perform verification, and controls switching on of the switching circuit to allow the electronic cigarette to enter a standby state if the anti-counterfeiting code is correct.

Preferably, the microcontroller may be configured to control switching off of the switching circuit when a standby time exceeds the preset standby time.

Preferably, the microcontroller MCU may be configured to randomly generate a new anti-counterfeiting code based on a preset program when it controls switching on of the switching circuit, and send the new anti-counterfeiting code to the encryption chip to allow the encryption chip to store the new anti-counterfeiting code for use at next time to perform identification.

Preferably, the vaporizer or the battery assembly may be further provided with a trigger switch, and the trigger switch may be a microphone-type automatic air flow switch or a digital pressure switch.

Preferably, the vaporizer or the battery assembly may be provided with a display unit or a vibration alarm unit, and the display unit or the vibration alarm unit may be electrically connected with the microcontroller.

Preferably, the microcontroller MCU may include 28 pins. Herein, the third pin is connected with the power supply signal VDD. The fourth pin is grounded. The eighth pin is connected with the first voltage signal R-DET of the heating element. The nineth pin is connected with the second voltage signal I-DET of the heating element. The fourteenth pin is connected with the resistance detection enable signal R-DET-EN. The twenty-second pin is connected with the output enable signal PWM-EN. The twenty-seventh pin is connected with the data communication signal SDQ.

Preferably, the encryption chip may include 3 pins. Herein, the first pin is connected with the lock signal LOCK. The second pin is grounded. The third pin is grounded. The circuit board has an encryption chip control circuit connected with the encryption chip. The encryption chip control circuit may include the lock signal LOCK and the data communication signal SDQ. The resistors R22, R31 are connected in series between the lock signal LOCK and the data communication signal SDQ. Between the resistors R22, R31, a zener diode D1 is connected and is grounded. The data signal SDQ is connected with the resistor R60, and the other end of the resistor R60 is connected with the power supply BAT+.

Preferably, the circuit board may have an output detection circuit comprising a MOS transistor Q1 and a MOS transistor Q2. The MOS transistor Q1 and the MOS transistor Q2 respectively include 8 pins. Herein, the first pin, the second pin, the sixth pin, the seventh pin, and the eighth pin are combined and serve as the drain D. The third pin serves as the gate G. The fourth pin and the fifth pin are combined and serve as the source S. The drain D of the MOS transistor Q2 is connected with the output voltage signal PWM-OUT of the heating element. Meanwhile, the drain D of the MOS transistor Q2 is connected with the resistor R3 and then connected with the second voltage signal I-DET of the heating element. The second voltage signal I-DET of the heating element is connected with the resistor R33 and the capacitor C2 which are connected in parallel and then is grounded. The drain D of the MOS transistor Q1 is connected with the resistor R11 and then connected with the first voltage signal R-DET of the heating element. The first voltage signal R-DET of the heating element is connected with the resistor R24 and the capacitor C1 which are connected in parallel and then is grounded. Further, the resistor R5 is connected between the drain D of the MOS transistor Q1 and the drain D of the MOS transistor Q2. The resistor R7 is connected in series between the gate G and the source S of the MOS transistor Q2. The resistor R1 is connected in series with the gate G and the source S of the MOS transistor Q1. The source S of the MOS transistor Q2 is directly connected with the source S of the MOS transistor Q1 and is further connected with the power supply signal BAT+. The gate G of the MOS transistor Q2 is connected with the enable signal PWM-EN. The gate G of the MOS transistor Q1 is connected with the resistance detection enable signal R-DET-EN.

Preferably, the circuit board may have a power supply circuit comprising a power supply chip U5. The power supply chip U5 includes 4 pins. Herein, the pin A1 and the pin B1 are directly connected with each other and meanwhile are connected with the power supply signal BAT+ and the capacitors C12, C5. The other end of the capacitors C12, C5 is grounded. The pin A2 is connected with the power supply signal VDD and meanwhile is connected with the capacitors C13, C3. The other end of the capacitors C13, C3 is grounded. The zener diode D4 is connected in series between the pin A2 and the pin A1. The pin B2 is grounded.

The disclosure provides another technical solution as follow. An anti-counterfeiting method of an electronic cigarette having an encryption chip for anti-counterfeiting comprises steps as follows.
(1) Setting initial relative parameters;
(2) Determining whether the switching circuit is turned off or not, if yes, await to go to the step (5); if no, go to next step;
(3) By means of the microcontroller, determining whether the standby time exceeds the preset standby time or not, if yes, go to next step; if no, remain in the standby state;
(4) By means of the microcontroller, controlling switching off of the switching circuit, and then going back to the step (2);
(5) Connecting the vaporizer with the battery assembly;
(6) By means of the microcontroller, reading the anti-counterfeiting code preset in the encryption chip;
(7) Comparing the anti-counterfeiting code preset in the microcontroller with the anti-counterfeiting code preset in the encryption chip and determining whether they coincide with each other or not, if yes, go to the step (9); if no, go to next step;
(8) By means of the microcontroller, sending out an alarm signal and informing the user to use a valid vaporizer, and awaiting the invalid vaporizer to be removed by the user to go back to the step (5);
(9) By means of the microcontroller, controlling switching on of the switching circuit;
(10) Entering the standby state of the electronic cigarette, and going back to the step (3).

Preferably, between the step (9) and the step (10), the method further comprises steps as follows.
(9.1) By means of the microcontroller, randomly generating a new anti-counterfeiting code based on a preset program, storing it, and sending it to the encryption chip;
(9.2) Storing the new anti-counterfeiting code by means of the encryption chip.

Advantages

The electronic cigarette having an encryption chip for anti-counterfeiting according to the disclosure comprises the vaporizer further provided with an encryption chip, and the encryption chip and the microcontroller are preset with an identical anti-counterfeiting code. In the case that the vaporizer is connected with the battery assembly, the encryption chip and the microcontroller are wiredly connected, to allow the microcontroller to read and identify the anti-counterfeiting code. If the anti-counterfeiting code is correct, the microcontroller controls switching on of the switching circuit to allow the electronic cigarette to perform power-on operation and enter the standby state. In this way, the identification of genuine products can be effectively achieved, thereby facilitating anti-counterfeiting.

DETAILED DESCRIPTION OF ILLUSTRATED EMBODIMENTS

Figure 1:
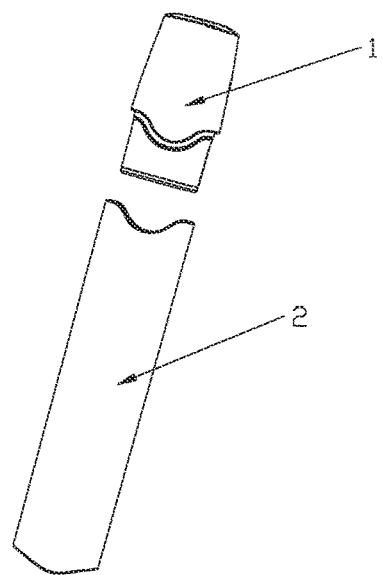
FIG. 1 is a schematic view illustrating an electronic cigarette having an encryption chip for anti-counterfeiting in a disassembled state according to the disclosure.
Figure 2:
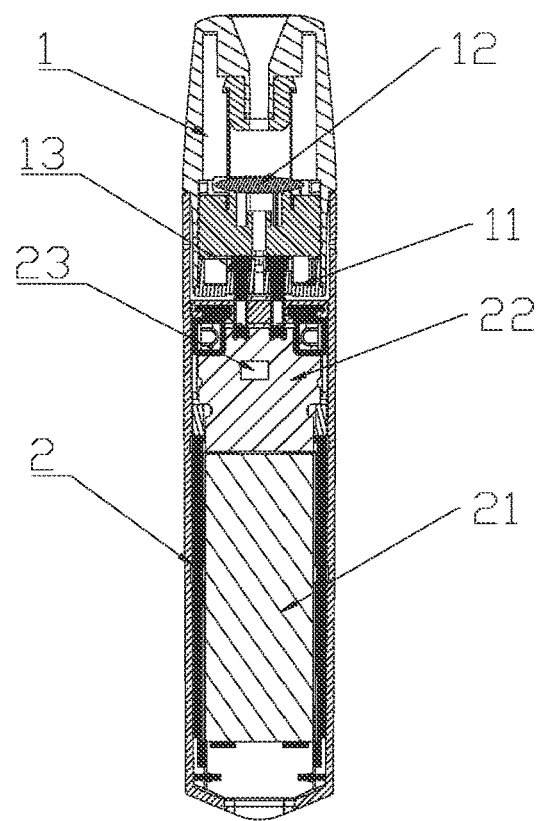
FIG. 2 is a cross-sectional view illustrating an electronic cigarette having an encryption chip for anti-counterfeiting according to the disclosure.

Referring to FIGS. 1 and 2, the disclosure provides an electronic cigarette having an encryption chip for anti-counterfeiting, which comprises a vaporizer 1 and a battery assembly 2 which are connected in a detachable manner. Herein, the vaporizer 1 is arranged with an encryption chip 11, a heating element 12 for heating and vaporizing electronic cigarette liquid, and other parts and components (not shown in the drawings) such as a vaporizing base, a base member, and a liquid storage chamber. The encryption chip 11 is a readable and writable chip storing and preset with an anti-counterfeiting code. The encryption chip 11 is connected with circuits of the control circuit board 22 by the contact and connection between electrodes arranged at the bottom of the vaporizer 1 and electrodes of the battery assembly 2. One electrode, among the electrodes arranged at the bottom of the vaporizer 1, is provided as a communication electrode 13 for electrically connecting the control circuit board 22. In addition to the communication electrode 13, two conventional power supply electrodes are provided.

The battery assembly 2 comprises a battery 21 and the control circuit board 22, wherein the control circuit board 22 is arranged with a microcontroller 23 and a switching circuit (not shown in the drawings). In the case that the vaporizer 1 is connected with the battery assembly 2, a circuit connection between the encryption chip 11 and the microcontroller 23 is achieved. The encryption chip 11 and the microcontroller 23 are configured in such a manner that, the microcontroller 23 reads the anti-counterfeiting code preset in the encryption chip 11, compares it with the anti-counterfeiting code preset in the microcontroller 23, and controls switching on of the switching circuit to allow the electronic cigarette to enter a power-on state or a standby state if the anti-counterfeiting code is correct.

In the standby state, the user may take a puff at any time. In the case that the user stops taking a puff for a period of time, i.e., the standby time exceeds the preset standby time, the microcontroller 23 controls switching off of the switching circuit to allow the electronic cigarette to enter a power-off state or a sleep state.

The electronic cigarette having an encryption chip for anti-counterfeiting according to the disclosure further utilizes the dynamic cipher technology. When the microcontroller 23 controls switching on of the switching circuit to perform the power-on operation, the microcontroller 23 randomly generates a new anti-counterfeiting code based on a preset program and sends it to the encryption chip 11, and the encryption chip 11 stores the new anti-counterfeiting code for use at next time to perform identification. The anti-counterfeiting code may include fixed code and may include dynamic code randomly generated based on a preset program.

The vaporizer 1 or the battery assembly 2 may be further provided with a trigger switch (not shown in the drawings). The trigger switch in the embodiment may be a digital pressure switch, and also may be a microphone-type automatic air flow switch in other embodiments.

The vaporizer 1 or the battery assembly 2 may be provided with a display unit or a vibration alarm unit (not shown in the drawings), and the display unit or the vibration alarm unit may be electrically connected with the microcontroller 23, to display relevant information for reference or provide an alarm to inform the user.

Figure 3:
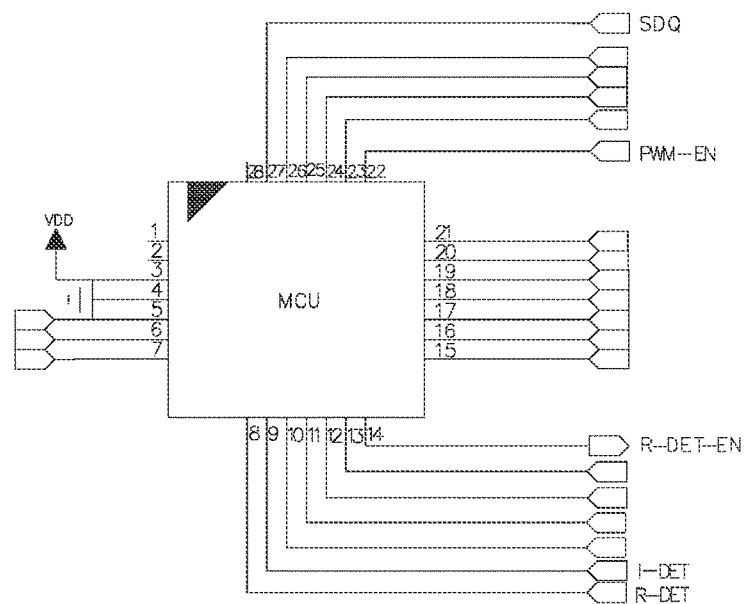
FIG. 3 is a circuit diagram of a microcontroller of an electronic cigarette having an encryption chip for anti-counterfeiting according to the disclosure.

Referring to FIG. 3, the microcontroller MCU includes 28 pins. Herein, the third pin is connected with the power supply signal VDD. The fourth pin is grounded. The eighth pin is connected with the first voltage signal R-DET of the heating element. The nineth pin is connected with the second voltage signal I-DET of the heating element. The fourteenth pin is connected with the resistance detection enable signal R-DET-EN. The twenty-second pin is connected with the output enable signal PWM-EN. The twenty-seventh pin is connected with the data communication signal SDQ.

Figure 4:
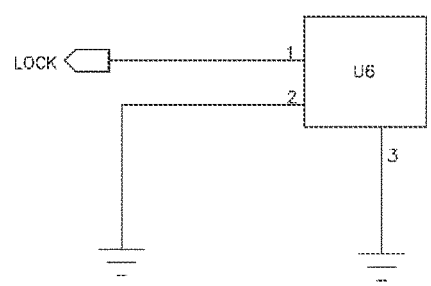
FIG. 4 is a schematic view illustrating an encryption chip of an electronic cigarette having an encryption chip for anti-counterfeiting according to the disclosure.

Referring to FIG. 4, the encryption chip includes 3 pins. Herein, the first pin is connected with the lock signal LOCK. The second pin is grounded. The third pin is grounded.

Figure 5:
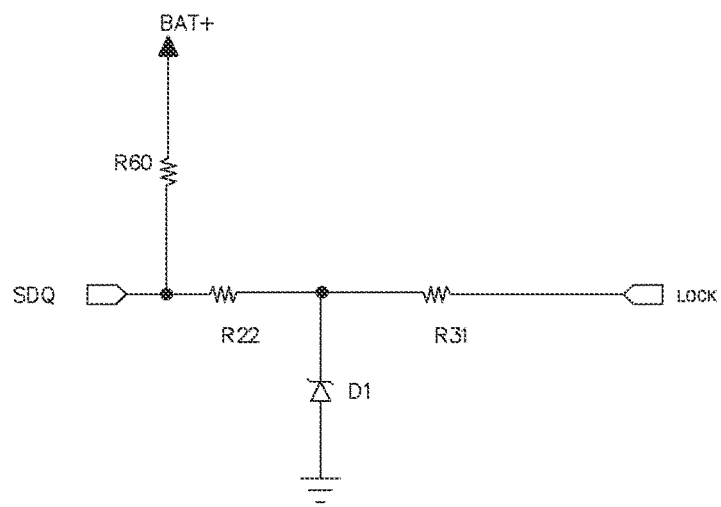
FIG. 5 is a control circuit diagram of an encryption chip of an electronic cigarette having an encryption chip for anti-counterfeiting according to the disclosure.

Referring to FIG. 5, the circuit board has an encryption chip control circuit connected with the encryption chip U6. The encryption chip U6 control circuit includes the lock signal LOCK and the data communication signal SDQ. The resistors R22, R31 are connected in series between the lock signal LOCK and the data communication signal SDQ. Between the resistors R22, R31, a zener diode D1 is connected and is grounded. The data signal SDQ is connected with the resistor R60, and the other end of the resistor R60 is connected with the power supply BAT+.

Figure 6:
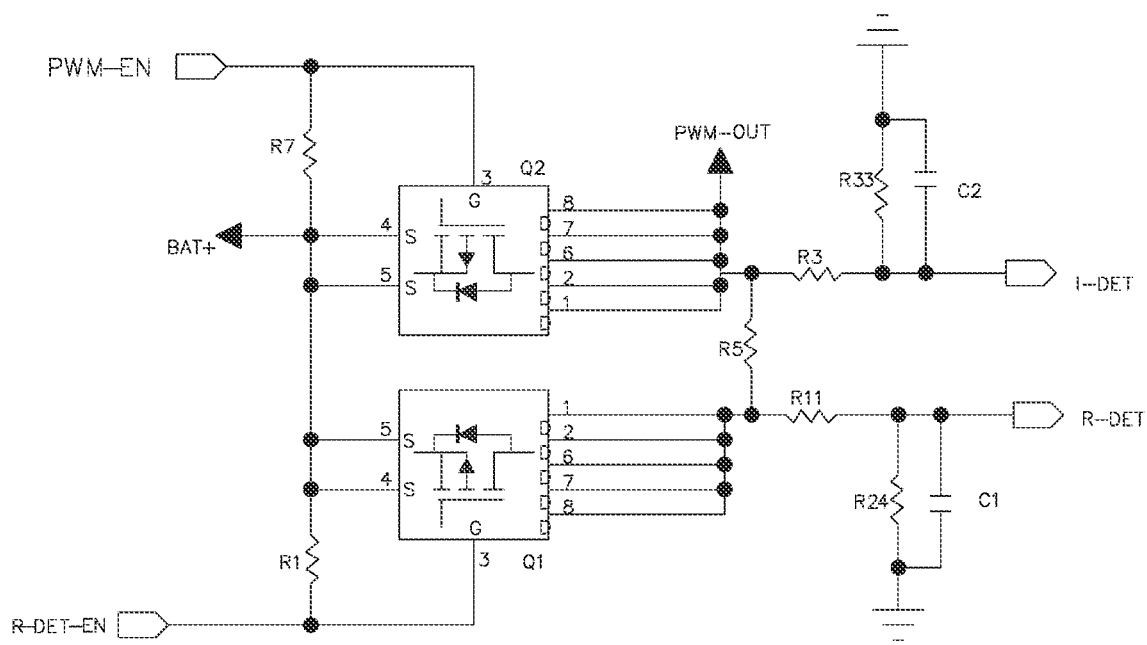
FIG. 6 is an output detection circuit diagram of an electronic cigarette having an encryption chip for anti-counterfeiting according to the disclosure.

Referring to FIG. 6, the circuit board has an output detection circuit comprising a MOS transistor Q1 and a MOS transistor Q2. The MOS transistor Q1 and the MOS transistor Q2 respectively include 8 pins. Herein, the first pin, the second pin, the sixth pin, the seventh pin, and the eighth pin are combined and serve as the drain D. The third pin serves as the gate G. The fourth pin and the fifth pin are combined and serve as the source S. The drain D of the MOS transistor Q2 is connected with the output voltage signal PWM-OUT of the heating element. Meanwhile, the drain D of the MOS transistor Q2 is connected with the resistor R3 and then connected with the second voltage signal I-DET of the heating element. The second voltage signal I-DET of the heating element is connected with the resistor R33 and the capacitor C2 which are connected in parallel and then is grounded. The drain D of the MOS transistor Q1 is connected with the resistor R11 and then connected with the first voltage signal R-DET of the heating element. The first voltage signal R-DET of the heating element is connected with the resistor R24 and the capacitor C1 which are connected in parallel and then is grounded. Further, the resistor R5 is connected between the drain D of the MOS transistor Q1 and the drain D of the MOS transistor Q2. The resistor R7 is connected in series between the gate G and the source S of the MOS transistor Q2. The resistor R1 is connected in series with the gate G and the source S of the MOS transistor Q1. The source S of the MOS transistor Q2 is directly connected with the source S of the MOS transistor Q1 and is further connected with the power supply signal BAT+. The gate G of the MOS transistor Q2 is connected with the enable signal PWM-EN. The gate G of the MOS transistor Q1 is connected with the resistance detection enable signal R-DET-EN.

Figure 7:
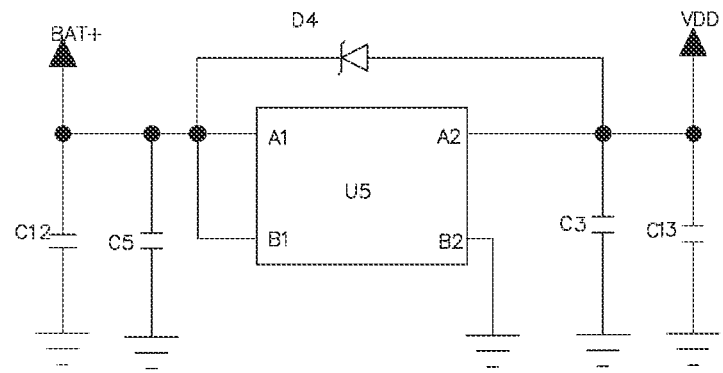
FIG. 7 is a power supply circuit diagram of an electronic cigarette having an encryption chip for anti-counterfeiting according to the disclosure.

Referring to FIG. 7, the circuit board has a power supply circuit comprising a power supply chip U5. The power supply chip U5 includes 4 pins. Herein, the pin A1 and the pin B1 are directly connected with each other and meanwhile are connected with the power supply signal BAT+ and the capacitors C12, C5. The other end of the capacitors C12, C5 is grounded. The pin A2 is connected with the power supply signal VDD and meanwhile is connected with the capacitors C13, C3. The other end of the capacitors C13, C3 is grounded. The zener diode D4 is connected in series between the pin A2 and the pin A1. The pin B2 is grounded.

Figure 8:
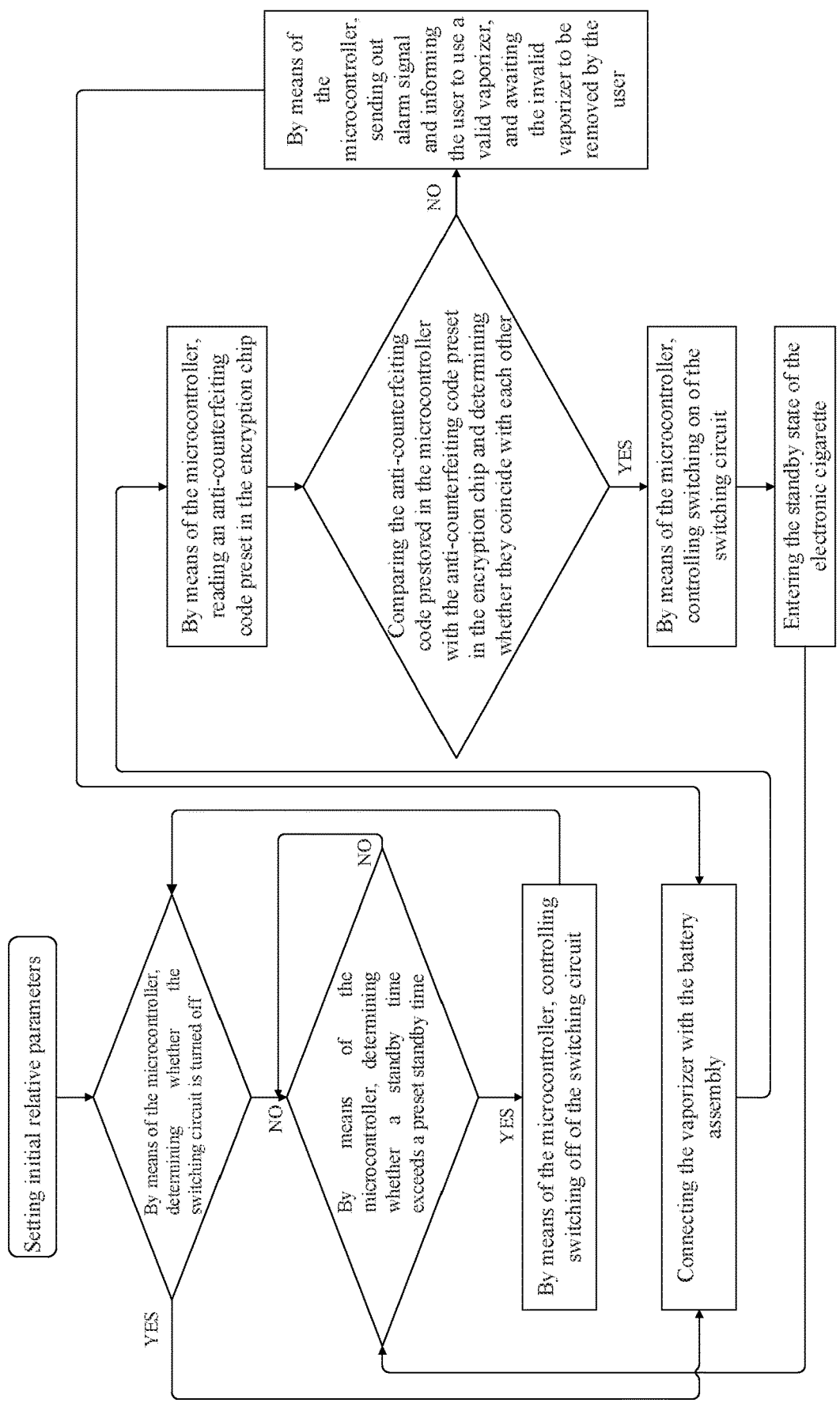
FIG. 8 is a first flowchart of an anti-counterfeiting method of an electronic cigarette having an encryption chip for anti-counterfeiting according to the disclosure.

Referring to FIG. 8, an anti-counterfeiting method of an electronic cigarette having an encryption chip for anti-counterfeiting according to the disclosure comprises steps as follows.

(1) Setting initial relative parameters;
(2) By means of the microcontroller, determining whether the switching circuit is turned off to indicate a power off state or a sleep state of the electronic cigarette or not, if yes, await to go to the step (5); if no, go to next step;
(3) By means of the microcontroller, determining whether the standby time exceeds the preset standby time or not, if yes, go to next step; if no, remain in the standby state;
(4) By means of the microcontroller, controlling switching off of the switching circuit to allow the electronic cigarette to perform power-off operation, and then going back to the step (2);
(5) Connecting the vaporizer with the battery assembly;
(6) By means of the microcontroller, reading the anti-counterfeiting code preset in the encryption chip;

(7) Comparing the anti-counterfeiting code preset in the microcontroller with the anti-counterfeiting code preset in the encryption chip and determining whether they coincide with each other or not, if yes, go to the step (9); if no, go to next step;

(8) By means of the microcontroller, sending out an alarm signal and informing the user to use a valid vaporizer, and awaiting the invalid vaporizer to be removed and a valid vaporizer to be inserted by the user, to go back to the step (5);

(9) By means of the microcontroller, controlling switching on of the switching circuit;

(10) Entering the standby state of the electronic cigarette, and going back to the step (3).

Figure 9:
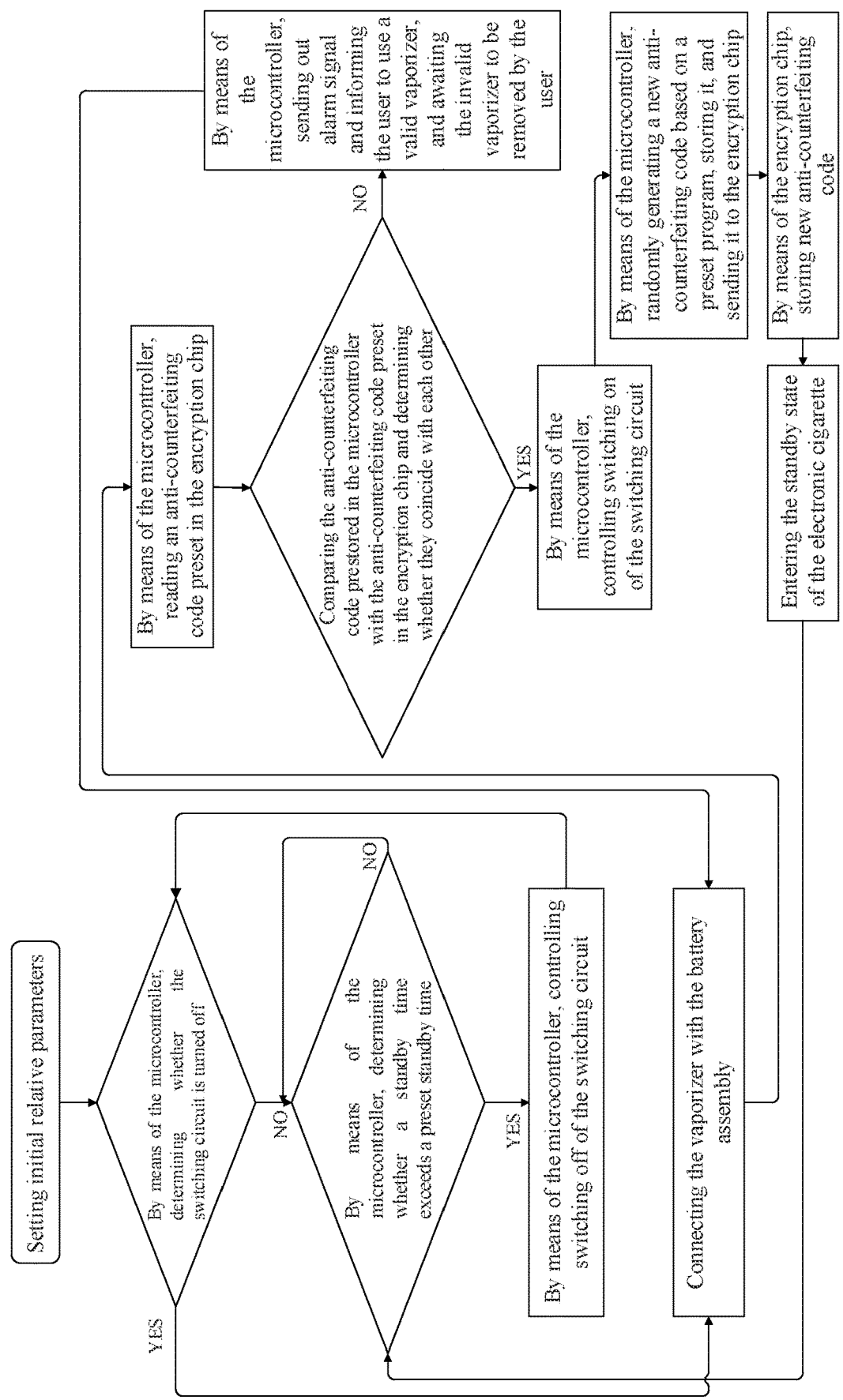
FIG. 9 is a second flowchart of an anti-counterfeiting method of an electronic cigarette having an encryption chip for anti-counterfeiting according to the disclosure.

Referring to FIG. 9, between the step (9) and the step (10) of the previous embodiment, the anti-counterfeiting method of an electronic cigarette having an encryption chip for anti-counterfeiting according to another embodiment further comprises steps as follows.

(9.1) By means of the microcontroller, randomly generating a new anti-counterfeiting code based on a preset program, storing it, and sending it to the encryption chip;

(9.2) Storing the new anti-counterfeiting code by means of the encryption chip.

INDUSTRIAL APPLICABILITY

All the above are merely preferred embodiments of the present invention. The present invention is intended to cover all equivalent arrangements and modifications without departing from the scope of the present invention.

The invention claimed is:

1. An electronic cigarette having an encryption chip for anti-counterfeiting, comprising a vaporizer and a battery assembly connected in a detachable manner, wherein the vaporizer is arranged with an encryption chip, and a heating element for heating and vaporizing electronic cigarette liquid, wherein the encryption chip is preset with an anti-counterfeiting code, the battery assembly comprises a battery and a control circuit board, wherein the control circuit board is arranged with a microcontroller and a switching circuit, the vaporizer is provided with a communication electrode electrically connected with the control circuit board, and in the case that the vaporizer is connected with the battery assembly, the communication electrode is contacted and electrically connected with an electrode of the battery assembly such that the encryption chip is electrically connected with the microcontroller of the control circuit board, wherein the microcontroller and the encryption chip are configured in such a manner that, the microcontroller reads an anti-counterfeiting code preset in the encryption chip, compares the anti-counterfeiting code preset in the encryption chip with an anti-counterfeiting code preset in the microcontroller to perform verification, and if the anti-counterfeiting code is correct, the microcontroller controls switching on of the switching circuit to allow the electronic cigarette to enter a standby state, and randomly generates a new anti-counterfeiting code based on a preset program, and sends the new anti-counterfeiting code to the encryption chip, to allow the encryption chip to store the new anti-counterfeiting code for performing identification next time, wherein the microcontroller is configured to control switching off of the switching circuit when a standby time exceeds a preset standby time, the encryption chip includes 3 pins, wherein a first pin is connected with a lock signal LOCK, a second pin is grounded, a third pin is grounded, the control circuit board has an encryption chip control circuit connected with the encryption chip, the encryption chip control circuit includes a lock signal LOCK and a data communication signal SDQ, resistors R22, R31 are connected in series between the lock signal LOCK and the data communication signal SDQ, between the resistors R22, R31, a zener diode D1 is connected and is grounded, the data signal SDQ is connected with the resistor R60, and other end of the resistor R60 is connected with a power supply BAT+.

2. The electronic cigarette having an encryption chip for anti-counterfeiting according to claim 1, wherein the vaporizer or the battery assembly is further provided with a trigger switch, and the trigger switch is a microphone-type automatic air flow switch or a digital pressure switch.

3. The electronic cigarette having an encryption chip for anti-counterfeiting according to claim 1, wherein the vaporizer or the battery assembly is provided with a display unit or a vibration alarm unit, and the display unit or the vibration alarm unit is electrically connected with the microcontroller.

4. The electronic cigarette having an encryption chip for anti-counterfeiting according to claim 1, wherein the microcontroller MCU includes 28 pins, wherein a third pin is connected with a power supply signal VDD, a fourth pin is grounded, an eighth pin is connected with a first voltage signal R-DET of the heating element, a nineth pin is connected with a second voltage signal I-DET of the heating element, a fourteenth pin is connected with a resistance detection enable signal R-DET-EN, a twenty-second pin is connected with an output enable signal PWM-EN, and a twenty-seventh pin is connected with a data communication signal SDQ.

5. The electronic cigarette having an encryption chip for anti-counterfeiting according to claim 4, wherein the control circuit board has an output detection circuit comprising a MOS transistor Q1 and a MOS transistor Q2, the MOS transistor Q1 and the MOS transistor Q2 respectively include 8 pins, wherein a first pin, a second pin, a sixth pin, a seventh pin, and an eighth pin are combined and serve as a drain D, a third pin serves as a gate G, a fourth pin and a fifth pin are combined and serve as a source S, the drain D of the MOS transistor Q2 is connected with an output voltage signal PWM-OUT of the heating element, and meanwhile the drain D of the MOS transistor Q2 is connected with a resistor R3 and then connected with a second voltage signal I-DET of the heating element, the second voltage signal I-DET of the heating element is connected with a resistor R33 and a capacitor C2 which are connected in parallel and then is grounded, the drain D of the MOS transistor Q1 is connected with a resistor R11 and then connected with a first voltage signal R-DET of the heating element, the first voltage signal R-DET of the heating element is connected with a resistor R24 and a capacitor C1 which are connected in parallel and then is grounded, a resistor R5 is connected between the drain D of the MOS transistor Q1 and the drain D of the MOS transistor Q2, a resistor R7 is connected in series between the gate G and the source S of the MOS transistor Q2, a resistor R1 is connected in series with the gate G and the source S of the MOS transistor Q1, the source S of the MOS transistor Q2 is directly connected with the source S of the MOS transistor Q1 and is further connected with a power supply signal BAT+, the gate G of the MOS transistor Q2 is connected with an enable signal PWM-EN, and the gate G of the MOS transistor Q1 is connected with a resistance detection enable signal R-DET-EN.

6. The electronic cigarette having an encryption chip for anti-counterfeiting according to claim 4, wherein the control circuit board has a power supply circuit comprising a power supply chip U5, the power supply chip includes 4 pins, wherein a pin A1 and a pin B1 are directly connected with each other and meanwhile are connected with a power supply signal BAT+ and capacitors C12, C5, other end of the capacitors C12, C5 is grounded, a pin A2 is connected with a power supply signal VDD and meanwhile is connected with capacitors C13, C3, other end of the capacitors C13, C3 is grounded, a zener diode D4 is connected in series between the pin A2 and the pin A1, and a pin B2 is grounded.

7. An anti-counterfeiting method of an electronic cigarette having an encryption chip for anti-counterfeiting according to claim 1, comprising steps of:
  (1) setting an initial relative parameter;
  (2) determining whether a switching circuit is turned off or not, if yes, await to go to step (5); if no, go to next step;
  (3) by means of a microcontroller, determining whether a standby time exceeds a preset standby time or not, if yes, go to next step; if no, remain in a standby state;
  (4) by means of the microcontroller, controlling switching off of the switching circuit, and then going back to the step (2);
  (5) connecting a vaporizer with a battery assembly;
  (6) by means of the microcontroller, reading an anti-counterfeiting code preset in the encryption chip;
  (7) comparing an anti-counterfeiting code preset in the microcontroller with the anti-counterfeiting code preset in the encryption chip and determining whether the anti-counterfeiting code preset in the microcontroller and the anti-counterfeiting code preset in the encryption chip coincide with each other or not, if yes, go to step (9); if no, go to next step;
  (8) by means of the microcontroller, sending out an alarm signal and informing a user to use a valid vaporizer, and awaiting an invalid vaporizer to be removed by the user to go back to the step (5);
  (9) by means of the microcontroller, controlling switching on of the switching circuit;
  (9.1) by means of the microcontroller, randomly generating a new anti-counterfeiting code based on a preset program, storing the new anti-counterfeiting code, and sending the new anti-counterfeiting code to the encryption chip;
  (9.2) by means of the encryption chip, storing the new anti-counterfeiting code for identification next time;
  (10) entering the standby state of the electronic cigarette, and going back to the step (3).

* * * * *